United States Patent
Takada et al.

(10) Patent No.: US 10,930,968 B2
(45) Date of Patent: Feb. 23, 2021

(54) NONAQUEOUS ELECTROLYTE SECONDARY BATTERY

(71) Applicant: Panasonic Intellectual Property Management Co., Ltd., Osaka (JP)

(72) Inventors: Akihiko Takada, Hyogo (JP); Fumiharu Niina, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 144 days.

(21) Appl. No.: 16/074,654

(22) PCT Filed: Feb. 20, 2017

(86) PCT No.: PCT/JP2017/006104
§ 371 (c)(1),
(2) Date: Aug. 1, 2018

(87) PCT Pub. No.: WO2017/150245
PCT Pub. Date: Sep. 8, 2017

(65) Prior Publication Data
US 2019/0044184 A1    Feb. 7, 2019

(30) Foreign Application Priority Data
Feb. 29, 2016    (JP) .............................. JP2016-037411

(51) Int. Cl.
*H01M 10/0525* (2010.01)
*H01M 10/04* (2006.01)
(Continued)

(52) U.S. Cl.
CPC ....... *H01M 10/0525* (2013.01); *H01M 4/485* (2013.01); *H01M 4/505* (2013.01);
(Continued)

(58) Field of Classification Search
CPC .... H01M 4/505; H01M 4/36; H01M 10/0525; H01M 10/04
See application file for complete search history.

(56) References Cited

U.S. PATENT DOCUMENTS

| | | | | |
|---|---|---|---|---|
| 2010/0247986 A1* | 9/2010 | Toyama | ................... | H01M 4/62 429/61 |
| 2012/0313570 A1* | 12/2012 | Ohtaniuchi | ....... | H01M 10/0525 320/103 |
| 2015/0295448 A1* | 10/2015 | Sugeno | ................... | B60L 53/14 701/22 |

FOREIGN PATENT DOCUMENTS

| | | |
|---|---|---|
| CN | 102820484 A | 12/2012 |
| JP | 2011-3364 A | 1/2011 |

(Continued)

OTHER PUBLICATIONS

International Search Report dated Mar. 21, 2017, issued in counterpart International Application No. PCT/JP2017/006104 (1 page).

(Continued)

*Primary Examiner* — Kenneth J Douyette
(74) *Attorney, Agent, or Firm* — Westerman, Hattori, Daniels & Adrian, LLP

(57) ABSTRACT

In a nonaqueous electrolyte secondary battery, a positive electrode contains a lithium transition metal oxide and a phosphoric acid compound. A nonaqueous electrolyte contains a dinitrile represented by a general formula: NC-A-CN (A represents a linear hydrocarbon having 1 to 10 carbon atoms or a hydrocarbon which contains a main chain having 1 to 10 carbon atoms and at least one side chain having 3 or less carbon atoms); an ether represented by a general formula: $R_1$—O—$R_2$—O—$R_3$ ($R_1$ and $R_3$ each represent a group which contains a main chain having 1 to 3 carbon (Continued)

atoms, and $R_2$ represents a chain hydrocarbon group having 1 to 3 carbon atoms); and a fluorophosphate salt.

10 Claims, 4 Drawing Sheets

(51) Int. Cl.
*H01M 10/0566* (2010.01)
*H01M 4/525* (2010.01)
*H01M 4/505* (2010.01)
*H01M 4/62* (2006.01)
*H01M 10/0567* (2010.01)
*H01M 4/485* (2010.01)

(52) U.S. Cl.
CPC ............. *H01M 4/525* (2013.01); *H01M 4/62* (2013.01); *H01M 10/045* (2013.01); *H01M 10/0566* (2013.01); *H01M 10/0567* (2013.01)

(56) References Cited

FOREIGN PATENT DOCUMENTS

| JP | 2012-134137 A | 7/2012 |
|---|---|---|
| WO | 2016/136212 A1 | 9/2016 |

OTHER PUBLICATIONS

English Translation of Search Report dated Nov. 23, 2020, issued in counterpart CN Application No. 201780010091.9. (2 pages).

\* cited by examiner

NONAQUEOUS ELECTROLYTE SECONDARY BATTERY

TECHNICAL FIELD

The present disclosure relates to a nonaqueous electrolyte secondary battery.

BACKGROUND ART

Patent Document 1 has disclosed a nonaqueous electrolyte secondary battery which includes: a positive electrode active material having a pH of 10.8 or more and containing a lithium transition metal compound which functions to occlude and release lithium ions; and a nonaqueous electrolyte containing a compound having a cyano group. Patent Document 1 has disclosed that gas generation during high-temperature storage can be suppressed. In addition, Patent Document 1 also has disclosed that since a cyclic carbonate having an unsaturated bond or a fluorine atom and a fluorophosphate salt are used in combination, a side reaction can be efficiently suppressed.

CITATION LIST

Patent Document

Patent Document 1: Japanese Published Unexamined Patent Application No. 2012-134137

SUMMARY OF INVENTION

Incidentally, a nonaqueous electrolyte secondary battery is required to improve regeneration characteristics at normal temperature while preferable cycle characteristics (high durability) are maintained. In particular, this requirement is to realize rapid charge and/or to suppress short circuit in the battery by reduction in precipitation of lithium on an electrode. However, according to the technique disclosed in Patent Document 1, sufficient regeneration characteristics are difficult to obtain.

A nonaqueous electrolyte secondary battery according to one aspect of the present disclosure comprises: a positive electrode: a negative electrode: and a nonaqueous electrolyte. The positive electrode contains a lithium transition metal oxide and a phosphoric acid compound, and the nonaqueous electrolyte contains a dinitrile represented by a general formula: NC-A-CN (A represents a linear hydrocarbon having 1 to 10 carbon atoms or a hydrocarbon which contains a main chain having 1 to 10 carbon atoms and at least one side chain having 3 or less carbon atoms); an ether represented by a general formula: $R_1$—O—$R_2$—O—$R_3$ ($R_1$ and $R_3$ each represent a group which contains a main chain having 1 to 3 carbon atoms, and $R_2$ represents a chain hydrocarbon group having 1 to 3 carbon atoms); and a fluorophosphate salt.

According to the nonaqueous electrolyte secondary battery of the aspect of the present disclosure, a high durability and an excellent normal-temperature regeneration can be simultaneously obtained.

DESCRIPTION OF EMBODIMENT

Figure 1:
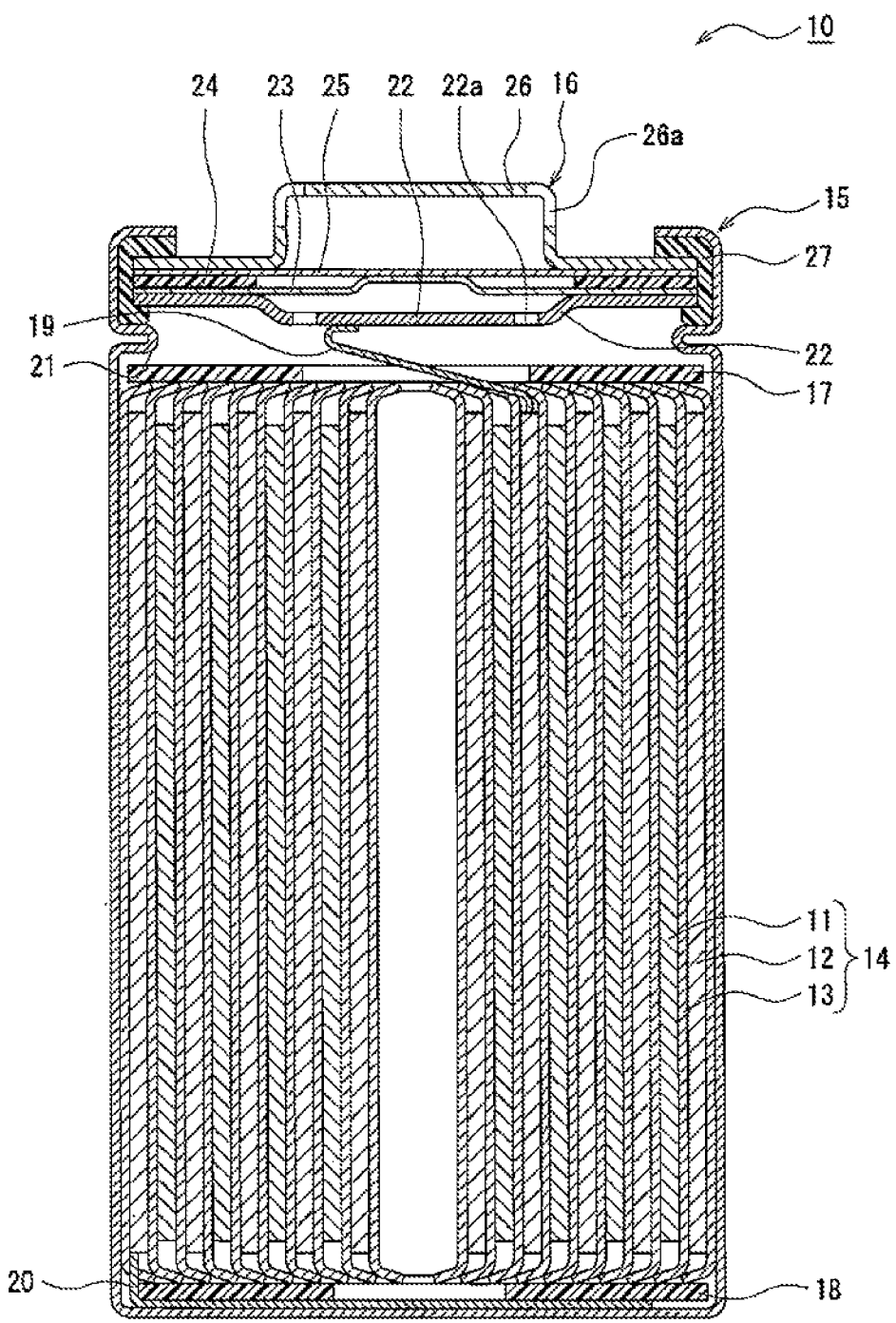
FIG. 1 is a cross-sectional view of a nonaqueous electrolyte secondary battery of one example of an embodiment.

According to one aspect of the present disclosure, since a positive electrode which contains a lithium transition metal oxide and a phosphoric acid compound and a nonaqueous electrolyte which contains a specific dinitrile, a specific ether, and a fluorophosphate salt are included, a nonaqueous electrolyte secondary battery having a high durability and excellent normal-temperature regeneration characteristics can be provided. In the nonaqueous electrolyte secondary battery according to the aspect of the present disclosure, the dinitrile suppresses the decomposition of an electrolyte liquid on a positive electrode surface and improves the durability of the battery, and at the same time, since the dinitrile is oxidation-decomposed on the positive electrode surface, a decomposition product is generated. In addition, this decomposition product moves to a negative electrode side and forms a film on a negative electrode surface together with the specific ether and the fluorophosphate salt. At this stage, it has been believed that since the phosphoric acid compound contained in the positive electrode is involved in an oxidation-decomposition reaction of the dinitrile (to generate a catalyst function), the oxidation-decomposition mode thereof is changed, and as a result, a, protective film having a low resistance is formed on the negative electrode surface. Accordingly, the normal-temperature regeneration characteristics can be significantly improved, and a high durability and an excellent normal-temperature regeneration can be simultaneously obtained. On the other hand, when the phosphoric acid compound is not present in the positive electrode, and when the dinitrile, the specific ether, and the fluorophosphate salt are also not present in the nonaqueous electrolyte, although a film is also formed on the negative electrode surface, it is believed that compared to the battery according to the present disclosure, the resistance of the film is high, and the normal-temperature regeneration characteristics are degraded.

Hereinafter, one example of the embodiment will be described in detail.

The drawings to be used for illustrating the embodiment are schematically drawn, and hence, particular dimensional ratios and the like should be understood in consideration of the following description. Hereinafter, although a cylindrical battery in which an electrode body having a winding structure is received in a cylindrical battery case will be described by way of example, the structure of the electrode body is not limited to the winding structure and may be a laminate structure in which a plurality of positive electrodes and a plurality of negative electrodes are alternately laminated with separators interposed therebetween. In addition, the battery case is not limited to the cylindrical shape, and a metal-made case having a square shape (square battery), a coin shape (coin type battery), or the like or a resin-made case (laminate battery) formed from resin films may be mentioned by way of example.

FIG. 1 is a cross-sectional view of a nonaqueous electrolyte secondary battery 10 which is one example of the embodiment. As shown in FIG. 1 by way of example, the nonaqueous electrolyte secondary battery 10 includes an electrode body 14, a nonaqueous electrolyte (not shown), and a battery case receiving the electrode body 14 and the nonaqueous electrolyte. The electrode body 14 has a winding structure in which a positive electrode 11 and a negative electrode 12 are wound with at least one separator 13 interposed therebetween. The battery case is formed of a cylindrical case main body 15 having a bottom plate and a sealing body 16 sealing an opening portion of the above main body.

The nonaqueous electrolyte secondary battery 10 includes insulating plates 17 and 18 disposed at the top and the bottom of the electrode body 14. In the example shown in FIG. 1, a positive electrode lead 19 fitted to the positive electrode 11 extends to a sealing body 16 side through a through-hole of the insulating plate 17, and a negative electrode lead 20 fitted to the negative electrode 12 extends to a bottom portion side of the case main body 15 along the outside of the insulating plate 18. The positive electrode lead 19 is connected by welding or the like to a bottom surface of a filter 22 which is a bottom plate of the sealing body 16, and a cap 26 which is a top plate of the sealing body 16 electrically connected to the filter 22 is used as a positive electrode terminal. The negative electrode lead 20 is connected by welding or the like to an inside surface of the bottom portion of the case main body 15, and the case main body 15 is used as a negative electrode terminal.

The case main body 15 is, for example, a cylindrical metal-made container having a bottom plate. A gasket 27 is provided between the case main body 15 and the sealing body 16, so that air-tightness in the battery case is secured. The case main body 15 has a protruding portion 21 which is formed, for example, by pressing a side surface portion from the outside and which supports the sealing body 16. The protruding portion 21 is preferably formed to have an annular shape along the circumference direction of the case main body 15, and an upper surface of the protruding portion 21 supports the sealing body 16.

The sealing body 16 includes the filter 22 and a valve body disposed thereon. The valve body seals an opening portion 22a of the filter 22 and is fractured when the inside pressure of the battery is increased by heat generated by internal short circuit or the like. In the example shown in FIG. 1, as the valve body, a lower valve body 23 and an upper valve body 25 are provided, and an insulating member 24 disposed between the lower valve body 23 and the upper valve body 25 and the cap 26 are further provided. The members forming the sealing body 16 each have, for example, a round shape or a ring shape, and the members other than the insulating member 24 are electrically connected to each other. When the inside pressure of the battery is remarkably increased, for example, since the lower valve body 23 is fractured at a thin portion thereof, and the upper valve body 25 is separated from the lower valve body 23 since being expanded to a cap 26 side, the electrical connection between the above two valve bodies is disconnected. When the inside pressure is further increased, the upper valve body 25 is fractured, and as a result, a gas is exhausted from an opening portion 26a of the cap 26.

[Positive Electrode]

The positive electrode contains a lithium transition metal compound and a phosphoric acid compound. The positive electrode includes a positive electrode collector and at least one positive electrode mixture layer formed thereon, and the positive electrode mixture layer contains the lithium transition metal compound and the phosphoric acid compound. For the positive electrode collector, for example, foil of a metal, such as aluminum, stable in a positive electrode potential range or a film provided with the aforementioned metal on a surface layer thereof may be used. The positive electrode mixture layer preferably contains, besides the lithium transition metal compound and the phosphoric acid compound, an electrically conductive agent and a resin binder. The positive electrode may be formed, for example, in such a way that after a positive electrode mixture slurry containing the lithium transition metal compound, the phosphoric acid compound, the electrically conductive agent, the resin binder, and the like is applied on two surfaces of the positive electrode collector, and the coating films thus formed are dried, rolling is performed so as to form the positive electrode mixture layers on the two surfaces of the collector. The thickness of the positive electrode mixture layer is, for example, 50 to 120 μm.

The lithium transition metal oxide preferably contains at least nickel (Ni), cobalt (Co), and manganese (Mg) and more preferably further contains at least one metal element selected from zirconium (Zr), a Group V element, and a Group VI element. The lithium transition metal oxide is a composite oxide represented, for example, by a general formula: $Li\alpha Ni_xM_{(1-x)}O_2$ ($0.1 \le \alpha \le 1.2$, $0.3 \le x$, and M contains at least Co and Mn and preferably further contains Zr and W). As the Group V element and the Group VI element, vanadium (V), chromium (Cr), niobium (Nb), tantalum (Ta), and tungsten (W) may be mentioned. Among those elements mentioned above, W is preferable.

The lithium transition metal oxide functions as a positive electrode active material. As a metal element contained in the lithium transition metal oxide, besides Co, Ni, Mn, Zr, the Group V element, and the group VI element, boron (B), magnesium (Mg), aluminum (Al), titanium (Ti), iron (Fe), copper (Cu), zinc (Zn), gallium (Ga), strontium (Sr), indium (In), and tin (Sn) may be mentioned. The lithium transition metal oxides may be used alone, or at least two types thereof may be used in combination.

The contents of Zr and W in the lithium transition metal oxide with respect to the total molar amount of the transition metals contained in the above oxide are each preferably 0.01 to 3 percent by mole and particularly preferably 0.05 to 1 percent by mole. In the lithium transition metal oxide, Zr and W are preferably solid-solved. As a method in which Zr and W are solid-solved in the lithium transition metal oxide, for example, there may be mentioned a method in which after a composite oxide containing Ni, Co, and Mn; a lithium compound, such as lithium hydroxide and/or lithium carbonate; zirconium oxide; and a tungsten compound, such as tungsten oxide, are mixed together, firing is performed.

The positive electrode mixture layer contains the phosphoric acid compound as described above. It is believed that the phosphoric acid compound catalyzes the oxidation-decomposition reaction of the dinitrile on the positive electrode surface and forms a preferable protective film having a low resistance on the negative electrode surface. As the phosphoric acid compound, for example, there may be used lithium phosphate, lithium dihydrogen phosphate, cobalt phosphate, nickel phosphate, manganese phosphate, potassium phosphate, calcium phosphate, sodium phosphate, magnesium phosphate, ammonium phosphate, or ammonium dihydrogen phosphate. Those phosphoric acid compounds may be used alone, or at least two types thereof may be used in combination.

As a preferable phosphoric acid compound, for example, in view of the stability during overcharge, lithium phosphate may be mentioned. As the lithium phosphate, for example, although there may be used lithium dihydrogen phosphate, lithium hydrogen phosphite, lithium monofluorophosphate, or lithium difluorophosphate, trilithium phosphate ($Li_3PO_4$) is preferable.

When the phosphoric acid compound is contained in the positive electrode mixture layer, that is, when the phosphoric acid compound is present in the vicinity of the lithium transition metal oxide which functions as the positive electrode active material, the effect described above can be expected. However, the phosphoric acid compound is preferably present so as to be adhered to the surface of the lithium transition metal oxide. The phosphoric acid compound is preferably dispersedly present on particle surfaces of the lithium transition metal oxide. The phosphoric acid compound is not localized on parts of the particle surfaces of the lithium transition metal oxide, for example, by the agglomeration thereof but is uniformly adhered to the entire of the particle surfaces.

The content of the phosphoric acid compound in the positive electrode mixture layer with respect to the lithium transition metal oxide is preferably 0.1 to 5 percent by mass, more preferably 0.5 to 4 percent by mass, and particularly preferably 1 to 3 percent by mass. Most of the phosphoric acid compound is preferably adhered to the surface of the lithium transition metal oxide. When the content of the phosphoric acid compound is in the range described above, the normal-temperature regeneration characteristics are efficiently improved without decreasing the positive electrode capacity.

The average particle diameter of the phosphoric acid compound is preferably smaller than the average particle diameter of the lithium transition metal oxide and is particularly preferably one fourth or less thereof. The average particle diameter of the phosphoric acid compound may be measured using a scanning electron microscope (SEM). In particular, after 100 particles of the phosphoric acid compound are randomly selected from a SEM image of a lithium transition metal oxide having a surface to which tungsten oxide is adhered, the longest major axis of each particle is measured, and the average obtained from the measured values is regarded as the average particle diameter. The average particle diameter of the phosphoric acid compound particles measured by this method is, for example, 30 to 500 nm and preferably 50 to 300 nm.

As a method in which the phosphoric acid compound particles are adhered to the particle surfaces of the lithium transition metal oxide, a method in which the lithium transition metal oxide and the phosphoric acid compound are mechanically mixed together may be mentioned by way of example. Alternatively, in a step of forming the positive electrode mixture slurry, the phosphoric acid compound may be added to slurry raw materials, such as the positive electrode active material, so as to be adhered to the surface of the lithium transition metal oxide. In order to increase the amount of the phosphoric acid compound to be adhered, the former method is preferably used.

The positive electrode mixture layer preferably further contains tungsten oxide adhered to the surface of the lithium transition metal oxide. Although the tungsten oxide may be contained in the positive electrode mixture layer, the tungsten oxide is preferably present so as to be adhered to the surface of the lithium transition metal oxide. The content of the tungsten oxide in the positive electrode mixture layer with respect to the total molar amount of the metal elements excluding Li of the lithium transition metal oxide is, based on the W element, preferably 0.01 to 3 percent by mole and particularly preferably 0.05 to 1 percent by mole.

As the tungsten oxide, $WO_3$, $WO_2$, and $W_2O_3$ may be mentioned. Among those compounds mentioned above, $WO_3$ having a most stable valence of 6 as the oxidation number of W is particularly preferable. The average particle diameter of the tungsten oxide is preferably smaller than the average particle diameter of the lithium transition metal oxide and is particularly preferably smaller than one fourth thereof. The average particle diameter of the tungsten oxide adhered to the surface of the lithium transition metal oxide is, for example, 30 to 500 nm and preferably 50 to 300 nm. The average particle diameter of the tungsten oxide may be measured using a SEM as is the case of the phosphoric acid compound.

The electrically conductive agent contained in the positive electrode mixture layer is used to improve the electrical conductivity of the positive electrode mixture layer. As the electrically conductive agent, for example, carbon materials, such as carbon black, acetylene black, Ketjen black, and graphite, may be mentioned. Those carbon materials may be used alone, or at least two types thereof may be used in combination.

The resin binder contained in the positive electrode mixture layer is used to maintain a preferable contact state between the positive electrode active material and the electrically conductive agent and also to improve a binding property of the positive electrode active material and the like to the surface of the positive electrode collector. As the resin binder, for example, there may be mentioned a fluorine resin, such as a polytetrafluoroethylene (PTFE) or a poly(vinylidene fluoride) (PVdF), a polyacrylonitrile (PAN), a polyimide resin, an acrylic resin, or a polyolefin resin. Those resins each may be used together with a cellulose derivative, such as a carboxymethyl cellulose (CMC) or its salt (such as CMC-Na, CMC-K, or CMC-$NH_4$), a polyethylene oxide (PEO), or the like. Those compounds may be used alone, or at least two types thereof may be used in combination.

[Negative Electrode]

The negative electrode includes a negative electrode collector and at least one negative electrode active material layer formed thereon. For the negative electrode collector, for example, foil of a metal, such as copper, stable in a positive electrode potential range or a film provided with the aforementioned metal on a surface layer thereof may be used. The negative electrode active material layer preferably contains a resin binder besides the negative electrode active material. The negative electrode may be formed, for example, in such a way that after a negative electrode mixture slurry containing the negative electrode active material, the resin binder, and the like is applied on the negative electrode collector, and the coating films thus formed are then dried, rolling is performed so as to form the negative electrode active material layers on two surfaces of the collector.

As the negative electrode active material, any material capable of reversely occluding and releasing lithium ions may be used, and for example, a carbon material, such as natural graphite or artificial graphite, a metal, such as silicon (Si) or tin (Sn), forming an alloy with lithium, or an oxide containing a metal element, such as Si or Sn, may be used. As the negative electrode active material, the compounds mentioned above may be used alone, or at least two types thereof may be used in combination.

For the resin binder, as is the case of the positive electrode, for example, a fluorine resin, a PAN, a polyimide resin, an acrylic resin, or a polyolefin resin may be used. When a mixture slurry is prepared using an aqueous solvent, for example, a CMC or its salt, a styrene-butadiene rubber (SBR), a polyacrylic acid (PAA) or its salt (such as PAA-Na or PAA-K), or a poly(vinyl alcohol) is preferably used.

[Separator]

For the separator, a porous sheet having an ion permeability and an insulating property is used. As a particular example of the porous sheet, for example, a fine porous thin film, a woven cloth, or a nonwoven cloth may be mentioned. As a material of the separator, for example, an olefin resin, such as a polyethylene or a polypropylene, or a cellulose is preferable. The separator may have either a monolayer structure or a multilayer structure.

[Nonaqueous Electrolyte]

The nonaqueous electrolyte includes a nonaqueous solvent and an electrolyte salt dissolved therein. The electrolyte salt is preferably a lithium salt. Furthermore, the nonaqueous electrolyte contains a dinitrile represented by a general formula: NC-A-CN (A represents a linear hydrocarbon having 1 to 10 carbon atoms or a hydrocarbon which contains a main chain having 1 to 10 carbon atoms and at least one side chain having 3 or less carbon atoms); an ether represented by a general formula: $R_1$—O—$R_2$—O—$R_3$ ($R_1$ and $R_3$ each represent a group which contains a main chain having 1 to 3 carbon atoms, and $R_2$ represents a chain hydrocarbon group having 1 to 3 carbon atoms); and a fluorophosphate salt. In addition, the nonaqueous electrolyte may also contain other additives, such as vinylene carbonate (VC).

Since being adhered to or decomposed at the positive electrode surface to form a film, the dinitrile described above suppresses the decomposition of the electrolyte liquid and has a function of improving cycle characteristics (durability) of the battery. In addition, the dinitrile is oxidation-decomposed at the positive electrode surface to form a protective film on the negative electrode surface together with the ether and the fluorophosphate salt. As described above, it is believed that the phosphoric acid compound of the positive electrode is involved in the oxidative decomposition of the dinitrile. As an example of the dinitrile, there may be mentioned a linear dinitrile, such as malononitrile, succinonitrile, glutaronitrile, adiponitrile, pimelonitrile, suberonitrile, azelanitrile, sebaconitrile, undecanedinitrile, dodecanedinitrile, fumaronitrile, 3-hexenedinitrile, or maleonitrile; or a dinitrile containing a side chain, such as methyl malononitrile, ethyl malononitrile, isopropyl malononitrile, tert-butyl malononitrile, methyl succinonitrile, 2,2-dimethyl succinonitrile, 2,3-dimethyl succinonitrile, 2,3,3-trimethyl succinonitrile, 2,2,3,3-tetramethyl succinonitrile, bicyclohexyl-1,1-dicarbonitrile, bicyclohexyl-2,2-dicarbonitrile, bicyclohexyl-3,3-dicarbonitrile, 2,5-dimethyl-2,5-hexane-dicarbonitrile, 2,3-diisobutyl-2,3-dimethyl succinonitrile, 2,2-diisobutyl-3,3-dimethyl succinonitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, or 2,3,3,4-tetramethyl glutaronitrile. In addition, the carbon number of the side chain is preferably 3 or less. Those compounds mentioned above may be used alone, or at least two types thereof may be used in combination.

The carbon number of the dinitrile is, for example, 3 to 12, preferably 4 to 10, more preferably 4 to 7, and particularly preferably 5 to 7. In the case of the dinitrile having a side chain, the carbon number is particularly preferably 5 to 7. That is, the carbon number of the above A is preferably 2 to 8, more preferably 2 to 5, and particularly preferably 3 to 5. Although, the dinitrile may have a plurality of side chains, in a preferable dinitrile, the number of the side chains is 0 to 3 and particularly preferably 0 or 1. That is, a particularly preferable dinitrile is a linear dinitrile or a dinitrile having one side chain, and for example, in particular, glutaronitrile (C5), adiponitrile (C6), pimelonitrile (C7), or 2-methyl glutaronitrile (C6) may be mentioned. Among those compounds mentioned above, adiponitrile (C6), pimelonitrile (C7), or 2-methyl glutaronitrile (C6) is preferable.

The content of the dinitrile with respect to the nonaqueous solvent in the nonaqueous electrolyte is preferably 0.05 to 5 percent by mass, more preferably 0.1 to 3 percent by mass, and particularly preferably 0.25 to 1 percent by mass. When the content of the dinitrile is in the range described above, the durability of the battery can be efficiently improved, and a preferable protective film is likely to be formed on the negative electrode surface.

The ether represented by a general formula: $R_1$—O—$R_2$—O—$R_3$ ($R_1$ and $R_3$ each represent a group which contains a main chain having 1 to 3 carbon atoms, and $R_2$ represents a chain hydrocarbon group having 1 to 3 carbon atoms) forms a protective film on the negative electrode surface together with a decomposition product of the dinitrile and the fluorophosphate salt. When being a chain hydrocarbon group having 1 to 3 carbon atoms, $R_2$ is appropriately solvated together with a Li ion using an ether bond interposed therebetween, and a protective film having a low resistance is likely to be formed on the negative electrode surface. When $R_1$ and $R_3$ are each a group which contains a main chain having 1 to 3 carbon atoms, a strong film is likely to be formed. In $R_1$ and $R_3$, a halogen atom or nitrogen may also be contained. The above halogen atom is preferably fluorine. As an example of the ether described above, for example, there may be mentioned 1,2-dimethoxyethane, 1,2-diethoxyethane, 1,2-dimethoxymethane, dimethoxymethane, diethoxymethane, ethylene glycol 1,2-bis(2-propynyl) ether, 1,2-dipropoxyethane, 1,2-dipropoxymethane 1-bromo-2-(2-methoxyethoxy)ethane, 1,2-bis(1-chloromethoxy)ethane, 1,2-bis(2-chloroethoxy)ethane, 1,2-bis(2-iodoethoxy)ethane, ethylene glycol bis (propionitrile) ether, ethylene glycol bis(acetonitrile) ether, 3,6-dioxa-1,8-octanedithiol, 2-methoxyethoxymethyl chloride, 1,2-bis(1-fluoromethoxy)ethane, 1,2-bis(1,1-difluoromethoxy)ethane 1,2-bis(1,1,1-tridifluoromethoxy)ethane, 1,2-bis(2-fluoroethoxy)ethane, 1,2-bis(2,2-difluoroethoxy) ethane 1,2-bis(2,2,2-tridifluoroethoxy)ethane, 1-chloromethoxy-2-methoxyethane, 1-fluoromethoxy-2-methoxyethane, 1,1-difluoromethoxy-2-methoxyethane, 1,1,1-trifluoromethoxy-2-methoxyethane. As a particularly preferable ether, 1,2-dimethoxyethane may be mentioned.

The content of the above ether with respect to the nonaqueous solvent in the nonaqueous electrolyte is preferably 0.5 to 30 percent by volume, more preferably 1% to 20%, and particularly preferably 3% to 15%. When the content of the ether is in the range described above, a preferable protective film is likely to be formed on the negative electrode surface.

The fluorophosphate salt forms a protective film on the negative electrode surface together with the decomposition product of the dinitrile and the above ether. As an example of the fluorophosphate salt, for example, a monofluorophosphate salt, such as lithium monofluorophosphate, sodium monofluorophosphate, or potassium monofluorophosphate;

or a difluorophosphate salt, such as lithium difluorophosphate, sodium difluorophosphate, or potassium difluorophosphate, may be mentioned. Those fluorophosphate salts may be used alone, or at least two types thereof may be used in combination. Among those mentioned above, lithium monofluorophosphate or lithium difluorophosphate is preferable, and lithium difluorophosphate is particularly preferable.

The content of the fluorophosphate salt with respect to the nonaqueous solvent in the nonaqueous electrolyte is preferably 0.001 to 1 mol/L, more preferably 0.005 to 0.5 mol/L, and particularly preferably 0.01 to 0.1 mol/L. When the content of the fluorophosphate salt is in the range described above, a preferable protective film is likely to be formed on the negative electrode surface.

As the nonaqueous solvent contained in the nonaqueous electrolyte, for example, there may be used an ester, an ether, a nitrile, such as acetonitrile, an amide, such as dimethylformamide, or a mixed solvent containing at least two of the solvents mentioned above. The nonaqueous solvent may include a halogen substituent in which at least one hydrogen atom of one of the solvents mentioned above is substituted by a halogen atom such as fluorine.

As an example of the ester described above, for example, there may be mentioned a cyclic carbonate ester, such as ethylene carbonate (EC), propylene carbonate (PC), or butylene carbonate; a chain carbonate ester, such as dimethyl carbonate (DMC), ethyl methyl carbonate (EMC), diethyl carbonate (DEC), methyl propyl carbonate, ethyl propyl carbonate, or methyl isopropyl carbonate; a cyclic carboxylic acid ester, such as γ-butyrolactone (GBL) or γ-valerolactone (GVL); or a chain carboxylic acid ester, such as methyl acetate, ethyl acetate, propyl acetate, methyl propionate (MP), or ethyl propionate.

As an example of the ether described above, for example, there may be mentioned a cyclic ether, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, or a crown ether; or a chain ether, such as diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, diethylene glycol dimethyl ether, diethylene glycol diethyl ether, diethylene glycol dibutyl ether, triethylene glycol dimethyl ether, or tetraethylene glycol dimethyl.

As the halogen substituent, a fluorinated cyclic carbonate ester, such as fluoroethylene carbonate (FEC), a fluorinated chain carbonate ester, or a fluorinated chain carboxylic acid ester, such as methyl fluoropropionate (FMP), is preferably used.

For the lithium salt contained in the nonaqueous electrolyte, for example, there may be used $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, and n indicates 1 or 2), $LiB_{10}Cl_{10}$, LiCl, LiBr, LiI, chloroborane lithium, a lithium lower aliphatic carbonate, a borate, such as $Li_2B_4O_7$, $Li(B(C_2O_4)_2)$, or $Li(B(C_2O_4)F_2)$, or an imide salt, such as $LiN(SO_2CF_3)_2$, $LiN(SO_2F_2)_2$, or $LiN(C_1F_{2l+1}SO_2)$ $(C_mF_{2m+1}SO_2)$ (l and m each indicate an integer of 1 or more). The lithium salts mentioned above may be used alone, or at least two types thereof may be used in combination. The concentration of the lithium salt is preferably set to 0.8 to 1.8 moles per one liter of the nonaqueous solvent.

EXPERIMENTAL EXAMPLES

Hereinafter, although the present disclosure will be further described with reference to experimental examples, the present disclosure is not limited to the following experimental examples.

Experimental Example 1

[Formation of Positive Electrode Active Material]
Firing was performed on a nickel-cobalt-manganese composite hydroxide obtained in such a way that $NiSO_4$, $CoSO_4$, and $MnSO_4$ were mixed in an aqueous solution and were then co-precipitated, so that a nickel-cobalt-manganese composite oxide was formed. Next, the above composite oxide, lithium carbonate, tungsten oxide ($WO_3$), and zirconium oxide ($ZrO_2$) were mixed together using a grinding type mortar. The mixing ratio (molar ratio) of Li:Ni, Co, and Mn:W:and Zr of this mixture was 1.15:1.0:0.005:0.005. This mixture was fired at 900° C. for 10 hours in the air and was then pulverized, so that a lithium transition metal oxide (positive electrode active material) containing W and Zr was obtained. When an element analysis of this positive electrode active material thus obtained was performed by an ICP light emission analysis method, the molar ratios of the elements, Ni, Co, Mn, W, and Zr, were 46.7, 26.7, 25.6, 0.5, and 0.5, respectively.

Next, 0.5 percent by mole of $WO_3$ with respect to the total amount of the metal elements of the positive electrode active material other than Li and 2 percent by mass of lithium phosphate ($Li_3PO_4$) with respect to the positive electrode active material were mixed together, so that positive electrode active material particles having surfaces to which particles of $WO_3$ and particles of $Li_3PO_4$ were adhered were obtained.

[Formation of Positive Electrode]
The positive electrode active material particles having the surfaces to which the particles of $WO_3$ and the particles of $Li_3PO_4$ were adhered, carbon black, and a poly(vinylidene fluoride) (PVDF) were mixed together at a mass ratio of 91:7:2. N-methy-2-pyrollidone (NMP) was added to this mixture, and stirring was performed by a mixing machine (T. K. HIVIS Mix, manufactured by PRIMIX Corporation), so that a positive electrode mixture slurry was prepared. Next, after the positive electrode mixture slurry was applied on aluminum foil used as a positive electrode core body, and the coating films thus formed were then dried, rolling was performed on the coating films using a rolling roller machine, so that a positive electrode in which positive electrode mixture layers were formed on two surfaces of the aluminum foil was formed.

The positive electrode obtained as described above was observed using a SEM, and it was confirmed that particles of the tungsten oxide having an average particle diameter of 150 nm and particles of the lithium phosphate having an average particle diameter of 100 nm were adhered to the surface of the composite oxide. However, since the tungsten oxide and the lithium phosphate might be partially peeled away from the surface of the positive electrode active material in some cases in a step in which an electrically conductive agent and a resin binder were also mixed together therewith, those particles were contained in the positive electrode mixture layer in some cases without being adhered to the positive electrode active material particles. In addition, by the observation using a SEM, lithium phosphate adhered to the tungsten oxide and lithium phosphate present in the vicinity of the tungsten oxide were confirmed.

[Formation of Negative Electrode]

A graphite powder, a carboxymethyl cellulose (CMC), and a styrene-butadiene rubber (SBR) were mixed together at a mass ratio of 98:1:1. After water was added to this mixture, stirring was performed by a mixing machine (T. K. HIVIS Mix, manufactured by PRIMIX Corporation), so that a negative electrode mixture slurry was prepared. Next, after the negative electrode mixture slurry was applied on copper foil used as a negative electrode core body, and the coating films thus formed were then dried, rolling was performed on the coating films using a rolling roller machine, so that a negative electrode in which negative electrode mixture layers were formed on two surfaces of the copper foil was formed.

[Preparation of Nonaqueous Electrolyte Liquid]

Ethylene carbonate (EC), ethyl methyl carbonate (EMC), dimethyl carbonate (DMC), methyl propionate (MP), and 1,2-dimethoxyethane (DME) were mixed at a volume ratio of 30:15:40:5:10. $LiPF_6$ was dissolved in this mixed solvent so as to have a concentration of 1.2 mol/L. Furthermore, vinylene carbonate, succinonitrile, LiBOB ($Li(B(C_2O_4)_2)$), and lithium difluorophosphate ($LiPO_2F_2$) were dissolved in the nonaqueous solvent to have concentrations of 0.3 percent by mass, 0.5 percent by mass, 0.05 percent by mass, and 0.05 percent by mass, respectively, so that a nonaqueous electrolyte liquid was prepared.

[Formation of Battery]

After an aluminum lead and a nickel lead were fitted to the positive electrode and the negative electrode, respectively, a polyethylene-made fine porous film was used as a separator, and the positive electrode and the negative electrode were wound with the separators interposed therebetween, so that a winding type electrode body was formed. After this electrode body was received in a cylindrical battery case main body having a bottom plate, and the above nonaqueous electrolyte was charged therein, an opening portion of the battery case main body was sealed by a gasket and a sealing body, so that a cylindrical nonaqueous, electrolyte secondary battery (battery A1) was formed.

Experimental Example 2

Except for that glutaronitrile was used instead of using succinonitrile in the step of preparing the nonaqueous electrolyte liquid, a cylindrical nonaqueous electrolyte secondary battery (battery A2) was formed in a manner similar to that in Experimental Example 1.

Experimental Example 3

Except for that adiponitrile was used instead of using succinonitrile in preparation of the nonaqueous electrolyte liquid, a cylindrical nonaqueous electrolyte secondary battery (battery A3) was formed in a manner similar to that in Experimental Example 1.

Experimental Example 4

Except for that pimelonitrile was used instead of using succinonitrile in the step of preparing the nonaqueous electrolyte liquid, a cylindrical nonaqueous electrolyte secondary battery (battery A4) was formed in a manner similar to that in Experimental Example 1.

Experimental Example 5

Except for that suberonitrile was used instead of using succinonitrile in the step of preparing the nonaqueous electrolyte liquid, a cylindrical nonaqueous electrolyte secondary battery (battery A5) was formed in a manner similar to that in Experimental Example 1.

Experimental Example 6

Except for that 2-methyl glutaronitrile was used instead of using succinonitrile in the step of preparing the nonaqueous electrolyte liquid, a cylindrical nonaqueous electrolyte secondary battery (battery A6) was formed in a manner similar to that in Experimental Example 1.

Experimental Example 7

Except for that the addition amount of pimelonitrile was changed to 0.1 percent by mass in the step of preparing the nonaqueous electrolyte liquid, a cylindrical nonaqueous electrolyte secondary battery (battery A7) was formed in a manner similar to that in Experimental Example 4.

Experimental Example 8

Except for that the addition amount of pimelonitrile was changed to 0.25 percent by mass in the step of preparing the nonaqueous electrolyte liquid, a cylindrical nonaqueous electrolyte secondary battery (battery A8) was formed in a manner similar to that in Experimental Example 4.

Experimental Example 9

Except for that the addition amount of pimelonitrile was changed to 1 percent by mass in the step of preparing the nonaqueous electrolyte liquid, a cylindrical nonaqueous electrolyte secondary battery (battery A9) was formed in a manner similar to that in Experimental Example 4.

Experimental Example 10

Except for that the addition amount of pimelonitrile was changed to 3 percent by mass in the step of preparing the nonaqueous electrolyte liquid, a cylindrical nonaqueous electrolyte secondary battery (battery A10) was formed in a manner similar to that in Experimental Example 4.

Experimental Example 11

Except for that the addition amount of pimelonitrile was changed to 5 percent by mass in the step of preparing the nonaqueous electrolyte liquid, a cylindrical nonaqueous electrolyte secondary battery (battery A11) was formed in a manner similar to that in Experimental Example 4.

Experimental Example 12

Except for that $Li_3PO_4$ was not added in the step of forming the positive electrode active material, and $LiPO_2F_2$ and succinonitrile were not added in the step of preparing the nonaqueous electrolyte, a cylindrical nonaqueous electrolyte secondary battery (battery A12) was formed in a manner similar to that in Experimental Example 1.

Experimental Example 13

Except for that $Li_3PO_4$ was not added in the step of forming the positive electrode active material, and succinonitrile was not added in the step of preparing the nonaqueous electrolyte, a cylindrical nonaqueous electrolyte secondary battery (battery A13) was formed in a manner similar to that in Experimental Example 1.

Experimental Example 14

Except for that LiPO$_2$F$_2$ and succinonitrile were not added in the step of preparing the nonaqueous electrolyte, a cylindrical nonaqueous electrolyte secondary battery (battery A14) was formed in a manner similar to that in Experimental Example 1.

Experimental Example 15

Except for that Li$_3$PO$_4$ was not added in the step of forming the positive electrode active material, and LiPO$_2$F$_2$ was not added in the step of preparing the nonaqueous electrolyte, a cylindrical nonaqueous electrolyte secondary battery (battery A15) was formed in a manner similar to that in Experimental Example 4.

Experimental Example 16

Except for that LiPO$_2$F$_2$ was not added in the step of preparing the nonaqueous electrolyte, a cylindrical nonaqueous electrolyte secondary battery (battery A16) was formed in a manner similar to that in Experimental Example 4.

Experimental Example 17

Except for that succinonitrile was not added in the step of preparing the nonaqueous electrolyte, a cylindrical nonaqueous electrolyte secondary battery (battery A17) was formed in a manner similar to that in Experimental Example 1.

Experimental Example 18

Except for that Li$_3$PO$_4$ was not added in the step of forming the positive electrode active material, a cylindrical nonaqueous electrolyte secondary battery (battery A18) was formed in a manner similar to that in Experimental Example 1.

Experimental Example 19

Except for that Li$_3$PO$_4$ was not added in the step of forming the positive electrode active material, a cylindrical nonaqueous electrolyte secondary battery (battery A19) was formed in a manner similar to that in Experimental Example 2.

Experimental Example 20

Except for that Li$_3$PO$_4$ was not added in the step of forming the positive electrode active material, a cylindrical nonaqueous electrolyte secondary battery (battery A20) was formed in a manner similar to that in Experimental Example 4.

Experimental Example 21

Except for that Li$_3$PO$_4$ was not added in the step of forming the positive electrode active material, a cylindrical nonaqueous electrolyte secondary battery (battery A21) was formed in a manner similar to that in Experimental Example 5.

The cycle characteristics (durability) and the normal-temperature regeneration characteristics of each of the batteries A1 to A21 were evaluated, and the evaluation results are shown in Table 1. The normal-temperature regeneration value shown in Table 1 is a relative value based on the value (100%) of the battery A12.

Experimental Example 22

Except for that ethyl acetate (EA) was used instead of using 1,2-dimethoxyethane (DME) in the step of preparing the nonaqueous electrolyte liquid, a cylindrical nonaqueous electrolyte secondary battery (battery A22) was formed in a manner similar to that in Experimental Example 1.

Experimental Example 23

Except for that methyl acetate (MA) was used instead of using 1,2-dimethoxyethane (DME) in the step of preparing the nonaqueous electrolyte liquid, a cylindrical nonaqueous electrolyte secondary battery (battery A23) was formed in a manner similar to that in Experimental Example 1.

Experimental Example 24

Except for that acetonitrile (AN) was used instead of using 1,2-dimethoxyethane (DME) in the step of preparing the nonaqueous electrolyte liquid, a cylindrical nonaqueous electrolyte secondary battery (battery A24) was formed in a manner similar to that in Experimental Example 1.

Experimental Example 25

Except for that propionitrile (PN) was used instead of using 1,2-dimethoxyethane (DME) in the step of preparing the nonaqueous electrolyte liquid, a cylindrical nonaqueous electrolyte secondary battery (battery A25) was formed in a manner similar to that in Experimental Example 1.

[Test of Normal-Temperature Regeneration Characteristics]

A constant current charge was performed on each of the batteries A1 to A25 at a temperature condition of 25° C. and at a current of 850 mA until the voltage reached 4.1 V. Next, a constant voltage charge was performed at 4.1 V until the current reached 0.1 mA. Subsequently, a constant current discharge was performed at 850 mA until the voltage reached 2.5 V. The discharge capacity obtained when this constant current discharge was performed was regarded as the rated capacity of each battery.

Next, a constant current discharge was performed at a battery temperature of 25° C. and at a current of 850 mA until the voltage reached 2.5 V, and charge was again performed to 50% of the rated capacity. Next, from the maximum current at which when the charge cut-off voltage was set to 4.3 V, charge could be performed for 10 seconds, the normal-temperature regeneration value of each secondary battery at a state of charge (SOC) of 50% was obtained from the following formula.

Normal-Temperature Regeneration Value (SOC of 50%)=Measured Maximum Current×Charge Cut-off Voltage (4.3 V)

[Test of Cycle Characteristics]

A constant current charge to an SOC of 50% was performed on each of the batteries A1 to A25 at a temperature condition of 25° C. and at a current of 850 mA. Next, a cycle in which a charge was performed at a temperature condition of 60° C. and at a current of 1,700 mA until the voltage reached 4.1 V, a rest was then taken for 15 minutes, a discharge was performed at a current of 1,700 mA unit the voltage reached 2.5 V, and a rest was again taken for 15 minutes was performed repeatedly 500 times. In this case, the discharge capacity obtained after a 500$^{th}$ cycle was regarded as the capacity of each secondary battery after the test of the cycle characteristics. The ratio of this capacity obtained after the test of the cycle characteristics to the rated capacity described above was calculated as a capacity retention rate.

Figure 3A:
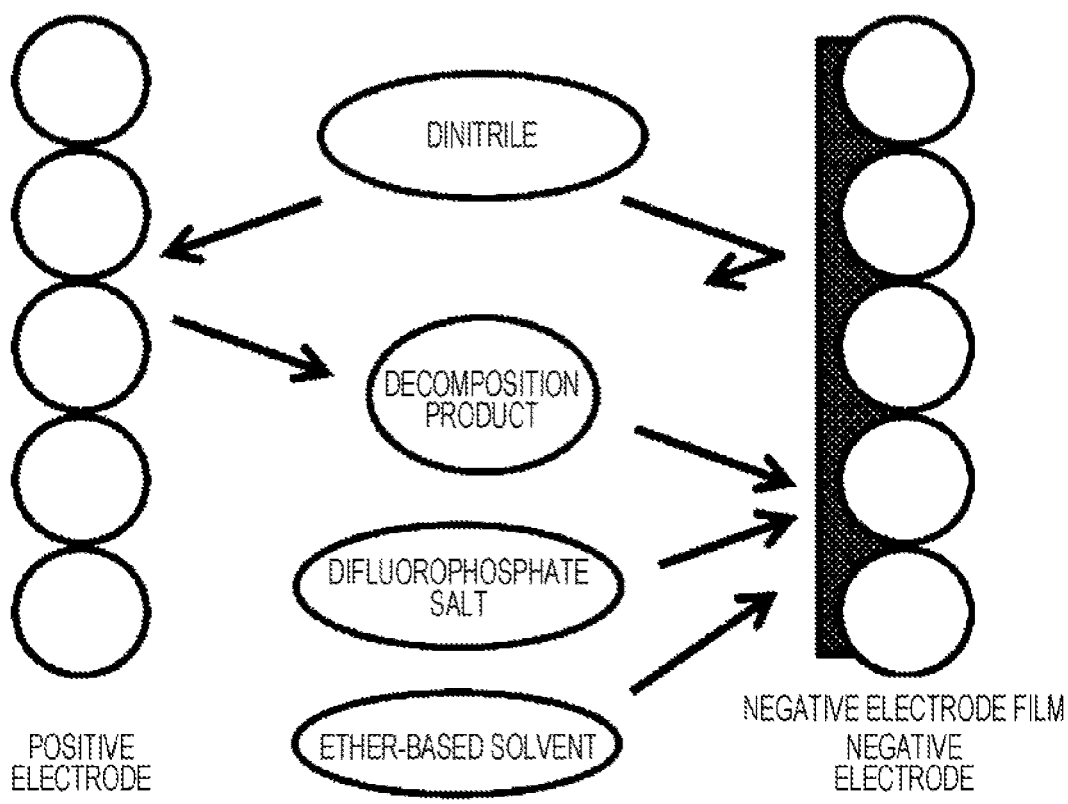
FIG. 3A is a view illustrating a mechanism of forming a film on a negative electrode surface in a related nonaqueous electrolyte secondary battery.
Figure 3B:
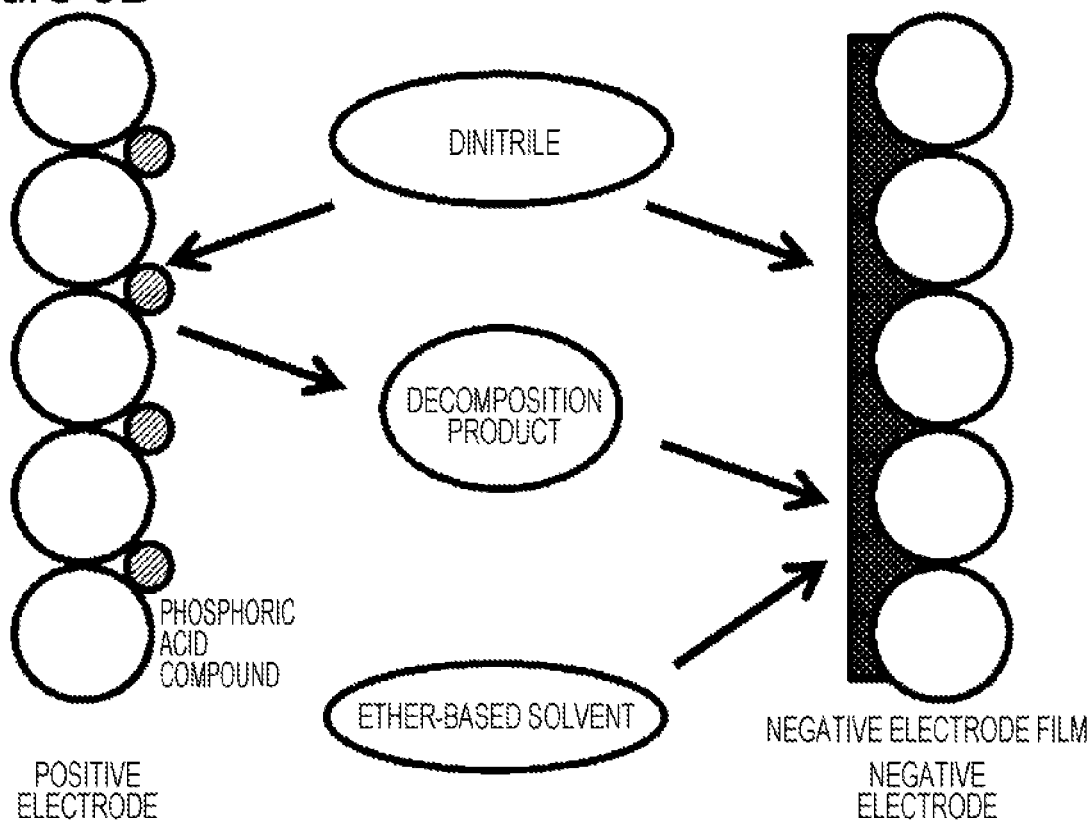
FIG. 3B is a view illustrating a mechanism of forming a film on a negative electrode surface in a related nonaqueous electrolyte secondary battery.
Figure 3C:
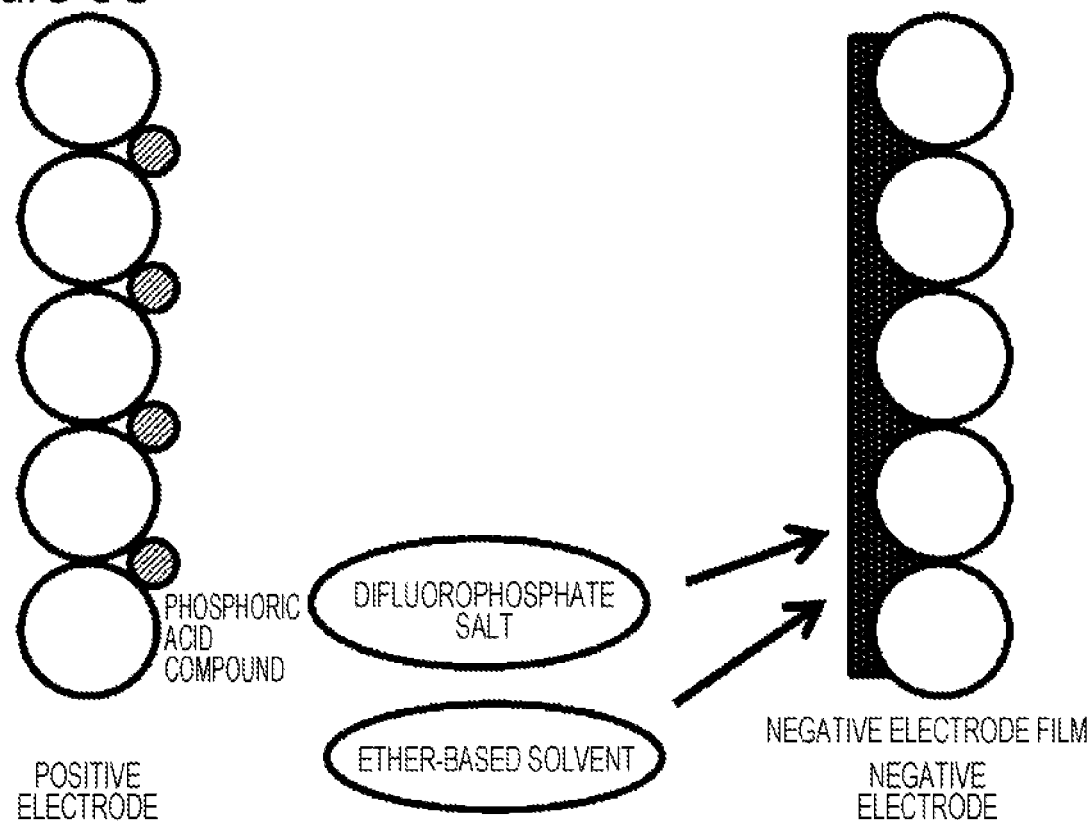
FIG. 3C is a view illustrating a mechanism of forming a film on a negative electrode surface in a related nonaqueous electrolyte secondary battery.

As shown in FIG. 3B, when the fluorophosphate salt is not present in the nonaqueous electrolyte liquid, since the dinitrile and the decomposition product thereof are mixed with only 1,2-dimethoxyethane, and a high resistant film is formed on the negative electrode surface, the normal-temperature regeneration is degraded. In addition, as shown in FIG. 3C, when the dinitrile is not present in the nonaqueous electrolyte liquid, the effect of improving the durability by the dinitrile cannot be obtained, and a high resistant negative electrode film is formed by 1,2-dimethoxyethane and the

TABLE 1

| | Positive electrode | Electrolyte liquid | | | Battery performance evaluation | |
|---|---|---|---|---|---|---|
| | $Li_3PO_4$ (wt %) | Dinitrile | Content (wt %) | $LiPO_2F_2$ (mol %) | Capacity retention rate (%) | Normal-temperature regeneration value (%) |
| A1 | 2 | Succinonitrile | 0.5 | 0.05 | 68 | 102 |
| A2 | 2 | Glutaronitrile | 0.5 | 0.05 | 67 | 104 |
| A3 | 2 | Adiponitrile | 0.5 | 0.05 | 66 | 106 |
| A4 | 2 | Pimelonitrile | 0.5 | 0.05 | 66 | 108 |
| A5 | 2 | Suberonitrile | 0.5 | 0.05 | 66 | 102 |
| A6 | 2 | 2-methyl glutaronitrile | 0.5 | 0.05 | 64 | 109 |
| A7 | 2 | Pimelonitrile | 0.1 | 0.05 | 65 | 103 |
| A8 | 2 | Pimelonitrile | 0.25 | 0.05 | 66 | 108 |
| A9 | 2 | Pimelonitrile | 1 | 0.05 | 66 | 110 |
| A10 | 2 | Pimelonitrile | 3 | 0.05 | 67 | 104 |
| A11 | 2 | Pimelonitrile | 5 | 0.05 | 62 | 102 |
| A12 | — | — | — | — | 55 | 100 |
| A13 | — | — | — | 0.05 | 60 | 98 |
| A14 | 2 | — | — | — | 53 | 99 |
| A15 | — | Pimelonitrile | 0.5 | — | 57 | 99 |
| A16 | 2 | Pimelonitrile | 0.5 | — | 54 | 98 |
| A17 | 2 | — | — | 0.05 | 60 | 99 |
| A18 | — | Succinonitrile | 0.5 | 0.05 | 68 | 85 |
| A19 | — | Glutaronitrile | 0.5 | 0.05 | 67 | 90 |
| A20 | — | Pimelonitrile | 0.5 | 0.05 | 66 | 93 |
| A21 | — | Suberonitrile | 0.5 | 0.05 | 66 | 90 |

As apparent from the results shown in Table 1, only in the case in which the dinitrile, 1,2-dimethoxyethane, $Li_3PO_4$, and $LiPO_2F_2$ are all contained, a high durability and an excellent normal-temperature regeneration can be simultaneously obtained (A1 to A11).

Figure 2:
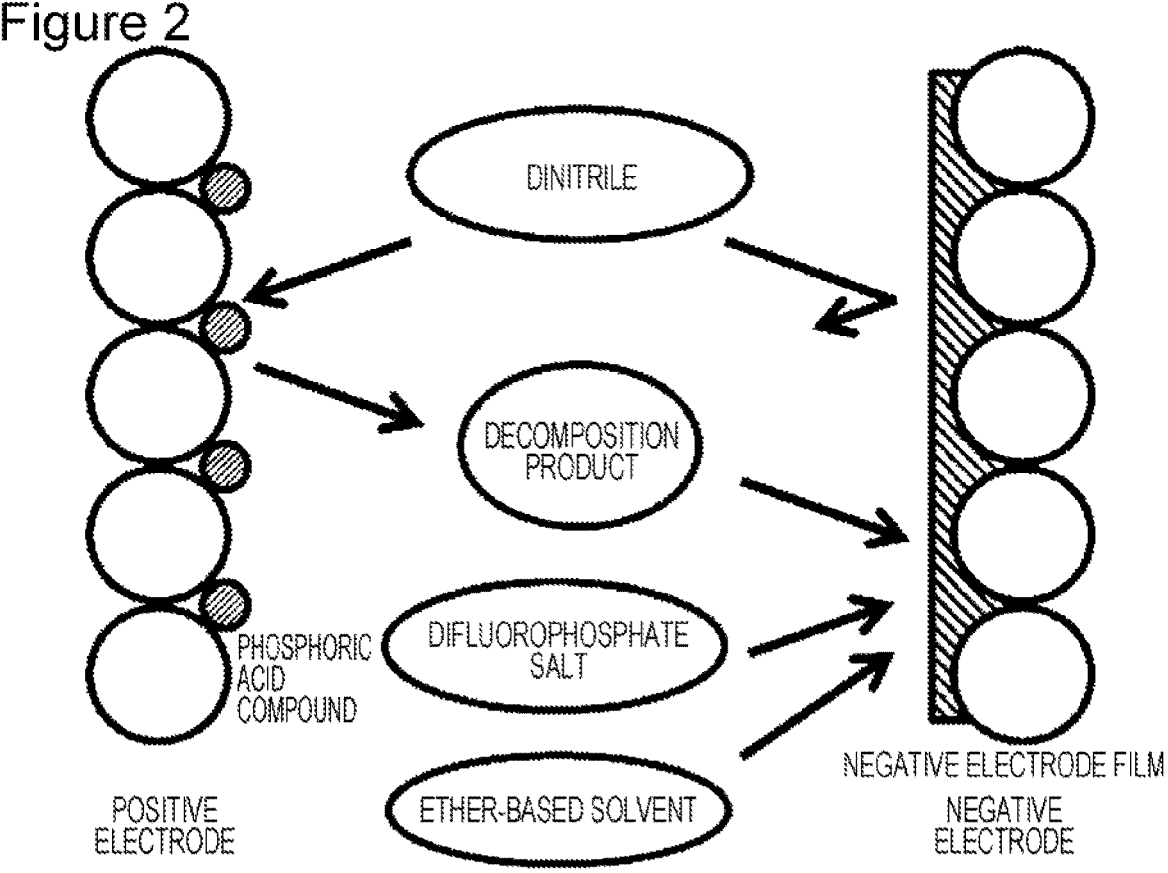
FIG. 2 is a view illustrating a mechanism of forming a film on a negative electrode surface in the nonaqueous electrolyte secondary battery of the example of the embodiment.

The results can be described as follows. As shown in FIG. 2, the dinitrile generates a mobile decomposition product by oxidation-decomposition thereof performed on the positive electrode surface, and a film in which the decomposition product, 1,2-dimethoxyethane, and the difluorophosphate salt are mixed together is formed on the negative electrode surface. In this case, when the phosphoric acid compound is present in the positive electrode, a catalyst function starts to work from the phosphoric acid compound as a starting point, and hence, the oxidation-decomposition mode of the dinitrile is changed. In addition, it is believed that by this decomposition product, 1,2-dimethoxyethane, and the difluorophosphate salt, a low resistant film is formed on the negative electrode surface. Accordingly, the normal-temperature regeneration can be significantly improved. In addition, this negative electrode film suppresses reduction-decomposition of the dinitrile and also suppresses the formation of a high resistant film.

Figure 3D:
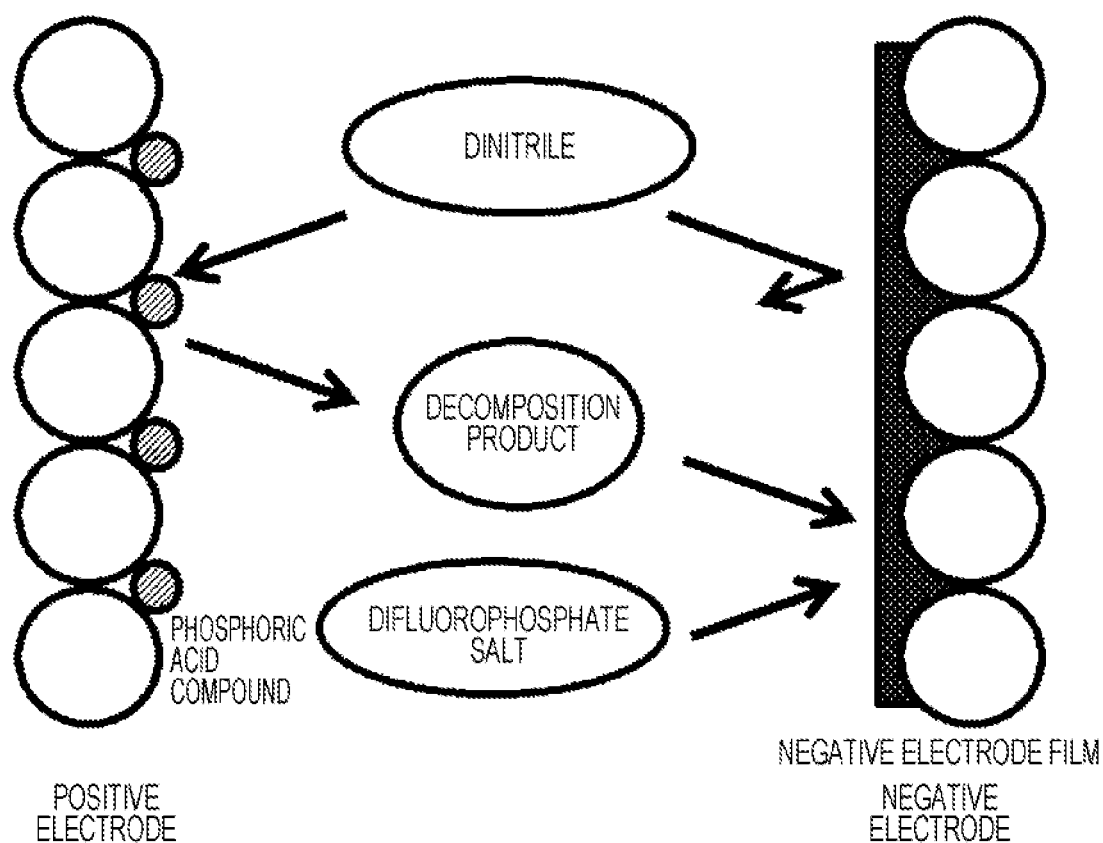
FIG. 3D is a view illustrating a mechanism of forming a film on a negative electrode surface in a related nonaqueous electrolyte secondary battery.

On the other hand, as shown in FIG. 3A, when the phosphoric acid compound is not present in the positive electrode, since the decomposition product of the dinitrile forms a high resistant film on the negative electrode surface together with 1,2-dimethoxyethane and the difluorophosphate salt, the normal-temperature regeneration is degraded.

fluorophosphate salt. As shown in FIG. 3D, when 1,2-dimethoxyethane is not present in the nonaqueous electrolyte liquid, since the dinitrile and the decomposition product thereof are mixed with only the difluorophosphate salt, and a high resistant film is formed on the negative electrode surface, the normal-temperature regeneration is degraded. In the above experiment examples, although 1,2-dimethoxyethane is used as the ether, even when an ether represented by a general formula: $R_1$—O—$R_2$—O—$R_3$ ($R_1$ and $R_3$ each represent a group which contains a main chain having 1 to 3 carbon atoms, and $R_2$ represents a chain hydrocarbon group having 1 to 3 carbon atoms) is used, it is also believed that the decomposition and the film formation occur at a negative electrode side by the presence of the ether bond, and the ether is mixed with the decomposition product by the dinitrile and the difluorophosphate salt to form a film; hence, an effect similar to that described above can also be expected.

As described above, the batteries A1 to A11 each have a high durability and an excellent normal-temperature regeneration. Furthermore, when a dinitrile having 5 to 7 carbon atoms is used, the effect of improving the normal-temperature regeneration is more significant. In addition, when the addition amount of the dinitrile is 0.25 to 1 percent by mass with respect to the nonaqueous solvent, the effect of improving the normal-temperature regeneration is more significant.

INDUSTRIAL APPLICABILITY

The present invention can be applied to a nonaqueous electrolyte secondary battery.

REFERENCE SIGNS LIST 10 nonaqueous electrolyte secondary battery
11 positive electrode
12 negative electrode
13 separator
14 electrode body
15 case main body
16 sealing body
17, 18 insulating plate
19 positive electrode lead
20 negative electrode lead
21 protruding portion
22 filter
22a opening portion
23 lower valve body
24 insulating member
25 upper valve body
26 cap
26a opening portion
27 gasket

The invention claimed is:

1. A nonaqueous electrolyte secondary battery comprising: a positive electrode; a negative electrode; and a nonaqueous electrolyte,
wherein the positive electrode contains a lithium transition metal oxide and a phosphoric acid compound,
the nonaqueous electrolyte contains a dinitrile represented by a general formula: NC-A-CN (A represents a linear hydrocarbon having 1 to 10 carbon atoms or a hydrocarbon which contains a main chain having 1 to 10 carbon atoms and at least one side chain having 3 or less carbon atoms); an ether represented by a general formula: $R_1$—O—$R_2$—O—$R_3$ ($R_1$ and $R_3$ each represent a group which contains a main chain having 1 to 3 carbon atoms, and $R_2$ represents a chain hydrocarbon group having 1 to 3 carbon atoms); and a fluorophosphate salt, and
wherein the phosphoric acid compound is adhered to a surface of the lithium transition metal oxide.

2. The nonaqueous electrolyte secondary battery according to claim 1, wherein the ether is 1,2-dimethoxyethane.

3. The nonaqueous electrolyte secondary battery according to claim 1, wherein the fluorophosphate salt is lithium difluorophosphate.

4. The nonaqueous electrolyte secondary battery according to claim 1, wherein the phosphoric acid compound is lithium phosphate.

5. The nonaqueous electrolyte secondary battery according to claim 1, wherein the number of carbon atoms of the dinitrile is 5 to 7.

6. The nonaqueous electrolyte secondary battery according to claim 1, wherein a content of the dinitrile is 0.25 to 3 percent by mass with respect to a nonaqueous solvent in the nonaqueous electrolyte.

7. The nonaqueous electrolyte secondary battery according to claim 1, wherein the lithium transition metal oxide contains at least nickel (Ni), cobalt (Co), and manganese (Mn).

8. The nonaqueous electrolyte secondary battery according to claim 7, wherein the lithium transition metal oxide contains at least one metal element selected from zirconium (Zr), a Group-V element, and a Group-VI element.

9. A nonaqueous electrolyte secondary battery comprising: a positive electrode, a negative electrode, and a nonaqueous electrolyte,
wherein the positive electrode contains:
a lithium transition metal oxide containing at least nickel (Ni), cobalt (Co), and manganese (Mg); and further containing at least one metal element selected from zirconium (Zr), a Group V element, and a Group VI element; and
lithium phosphate, and
the nonaqueous electrolyte contains:
at least one dinitrile selected from adiponitrile, pimelonitrile, or 2-methyl glutaronitrile;
1,2-dimethoxyethane; and
lithium difluorophosphate,
a content of the dinitrile with respect to the nonaqueous solvent in the nonaqueous electrolyte being 0.25 to 3 percent by mass; and
wherein the lithium phosphate is adhered to a surface of the lithium transition metal oxide.

10. The nonaqueous electrolyte secondary battery according to claim 1, wherein a content of the phosphoric acid compound with respect to the lithium transition metal oxide is 0.1 to 5 percent by mass.

* * * * *